UNITED STATES PATENT OFFICE.

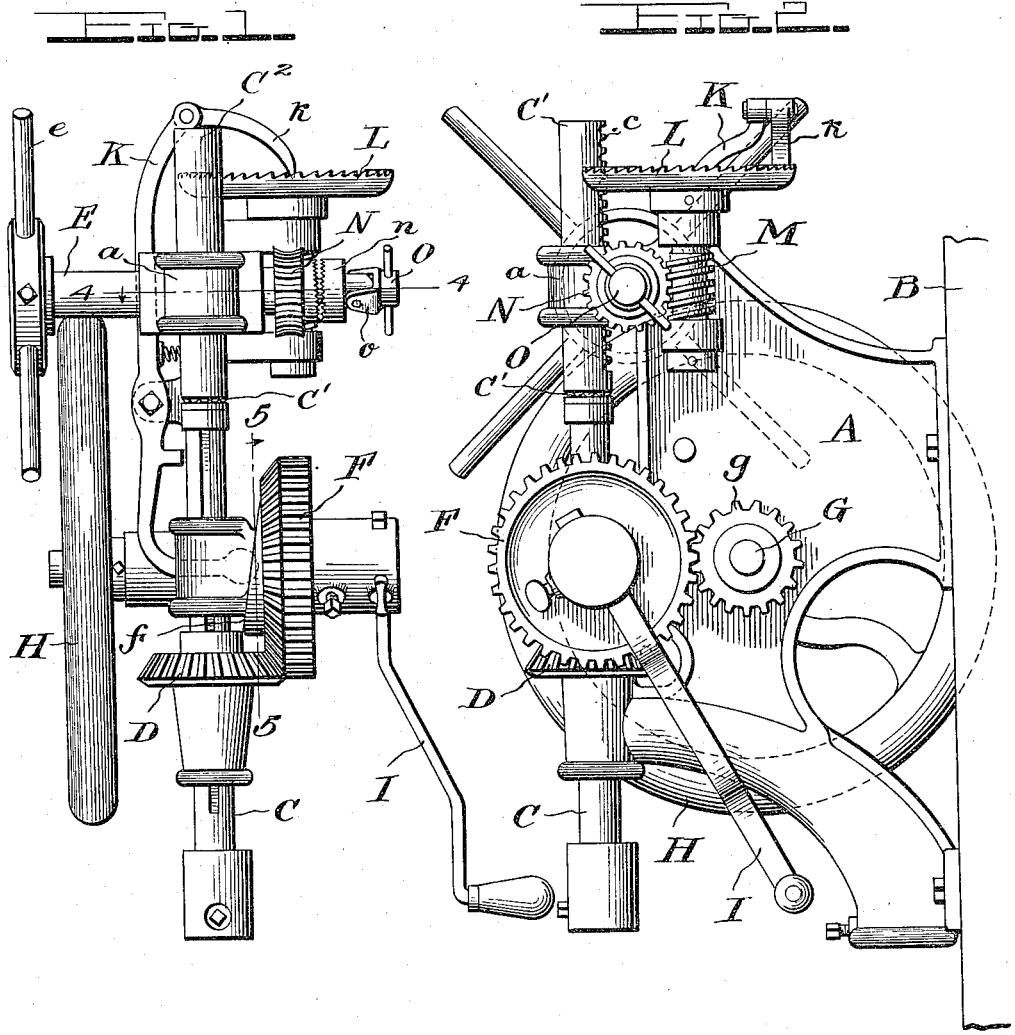

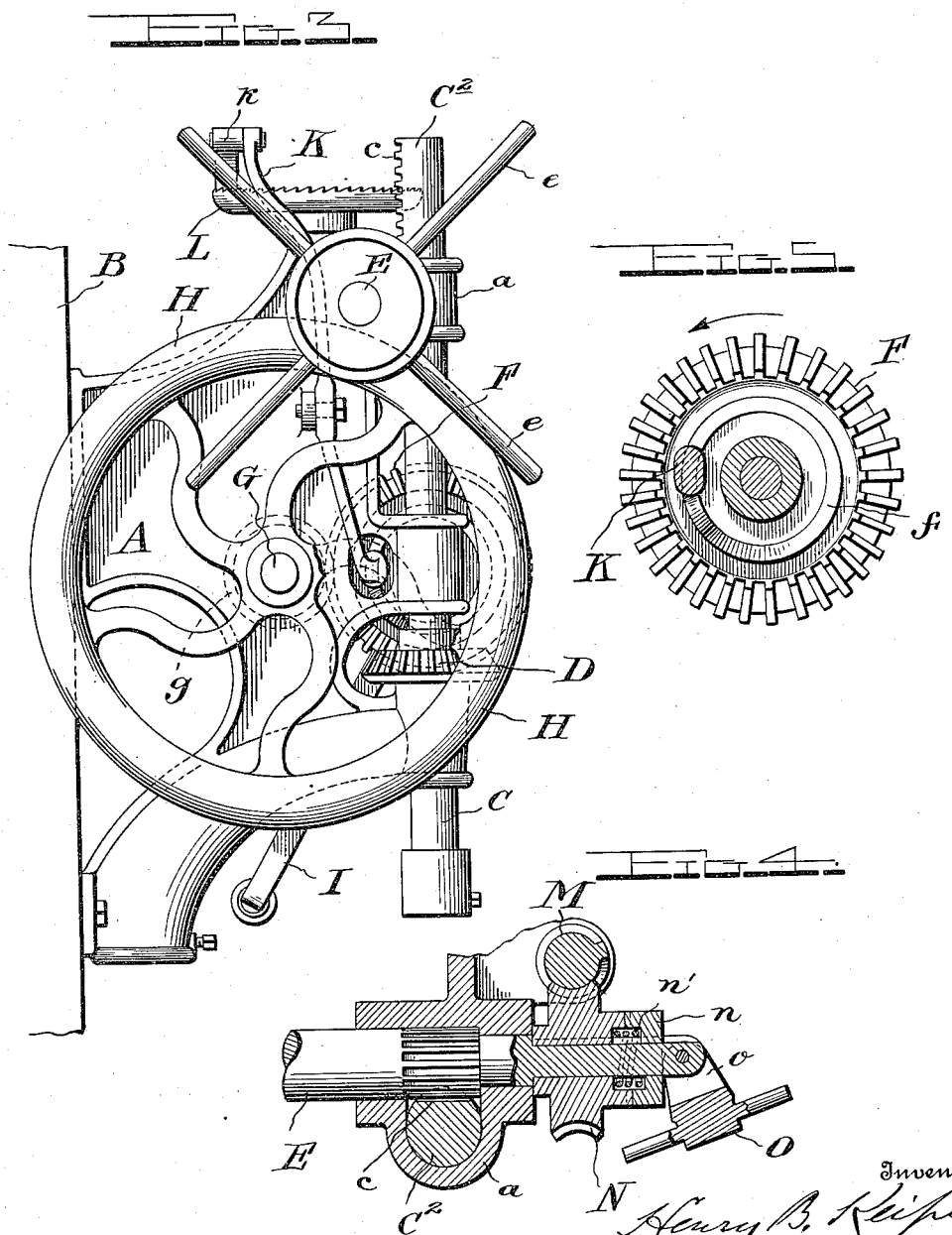

HENRY B. KEIPER, OF LANCASTER, PENNSYLVANIA, ASSIGNOR TO THE CHAMPION BLOWER & FORGE COMPANY, OF LANCASTER, PENNSYLVANIA, A CORPORATION OF PENNSYLVANIA.

DRILLING-MACHINE.

1,165,357.  Specification of Letters Patent.  Patented Dec. 21, 1915.

Application filed May 2, 1914. Serial No. 835,931.

*To all whom it may concern:*

Be it known that I, HENRY B. KEIPER, a citizen of the United States, residing at Lancaster, in the county of Lancaster and State of Pennsylvania, have invented certain new and useful Improvements in Drilling-Machines; and I hereby declare that the following is a full, clear, and exact description thereof, reference being had to the accompanying drawings, which form part of this specification.

This invention relates to drilling machines, and more particularly to drills in which provision is made for feeding the drill either automatically or by hand, together with means for returning the drill quickly to its normal or initial starting position at the end of a drilling operation.

The objects of the invention are to provide a simple and inexpensive yet durable and efficient drilling machine of the character referred to, consisting of few simple parts assembled in compact form, so as to occupy but a small space, and capable of removal when worn or broken, and of manipulation in such manner as to accomplish the desired results without liability to get out of order, and at a minimum of expense.

The invention will first be hereinafter more particularly described, with reference to the accompanying drawings, which form a part of this specification, and then pointed out in the claims at the end of the description.

In said drawings: Figure 1 illustrates a front elevation of a drilling machine embodying my invention; Fig. 2 is a side elevation of the same; Fig. 3 is a side elevation looking at the side opposite that shown in Fig. 2, and Figs. 4 and 5 are details.

Referring to said drawings, in which the same reference letters are used to denote corresponding parts in different views, the letter A denotes the machine frame, which may be of the form shown or of any suitable construction, and may be attached to an upright or other suitable support B, for holding and securing the machine against a wall or other support therefor.

In suitable bearings provided therefor in the machine frame is journaled a drill spindle C, which carries a beveled gear D having a spline and groove connection therewith, so as to adapt the gear to rotate with and impart rotary movement to the spindle while permitting longitudinal movement of the spindle therethrough. The spindle C is suitably connected by means of a suitable ball and socket joint or bearing $C^1$ with a non-rotatable extension $C^2$, which is slidably fitted in a part or boxing $a$ of the machine frame, and provided with a toothed portion or rack $c$, engaging teeth upon a shaft E for feeding the device either automatically or by hand, as will be hereinafter explained. The gear D engages inclined or beveled teeth of a gear F, which is journaled on a stud or arbor projecting from a sleeve or guide on the machine frame through which the drill spindle C passes. Said gear F has a toothed periphery engaging a pinion $g$ on a short shaft G, which extends transversely of and is journaled in suitable bearings formed or provided therefor in the machine frame, and said shaft G carries a fly-wheel H.

The gear F may be driven by means of a crank handle I removably secured thereto or to the hub thereof by means of a socket and set screw, as shown, or in any other well-known manner. The gear F is also formed or provided at one side thereof with a cam $f$ against which bears one end of a rocking lever K, which is pivoted intermediate its ends to the machine frame and carries at its upper or free end a pawl or dog $k$ which engages the teeth of a ratchet wheel L at one end of a worm-shaft M, which is journaled in suitable bearings formed or provided therefor on the machine frame. The worm or screw on the worm-shaft M engages a worm-wheel N, which is loose on an extension of the shaft E, whereby when said lever K is actuated by means of the cam $f$ on the gear F, motion will be imparted to the drill spindle through said worm-wheel and coöperating devices for automatically feeding the drill, and when the worm-wheel is allowed to remain idle on the shaft the latter may be rotated for feeding by hand. To this end the outer face or hub of the worm-wheel N is formed or provided with ratchet teeth or serrations engaging similar teeth or serrations on the inner face of a collar $n$ which is slidably fitted on the transverse shaft E and caused to rotate therewith, for imparting rotary movement thereto, by means of a spline and groove connection, so that when said worm-wheel is locked to the shaft by engagement with said collar, the worm-wheel, collar and shaft will rotate together and thereby impart motion to the drill spindle, causing the drill to approach or recede from the work, according to the direction in which the worm-wheel is rotated. But when the collar is thrown out of engagement with the worm-wheel the latter will remain idle or loose on the shaft, permitting independent rotation of the shaft for feeding by hand. When feeding by hand the worm-wheel and collar are normally held apart by means of a coiled or other suitable spring $n^1$ interposed between said collar and the hub of said worm-wheel. The worm-wheel may be locked to the shaft so as to cause them to rotate together by means of a cam device O which may consist of a swinging lever having arms $o$ pivoted to a projecting portion or extension of the shaft E, and having cam faces engaging the collar $n$ in such manner that when said arms are brought into a horizontal position as shown in Fig. 1, the teeth of the collar will be forced into engagement with the teeth on the hub of the worm-wheel and when thrown into a position at an angle to the axis of said shaft, as shown in Fig. 4, the collar will be thrown out of engagement with said cam wheel by the action of the spring $n^1$. Arms $e$ of a star wheel on the shaft E may be grasped by the operator for turning the shaft, when disengaged from the worm wheel N, so as to move the drill either in an upward or a downward direction, for the purpose of feeding by hand and for quickly returning the drill to its initial position at the completion of a drilling operation.

The operation of the invention will be readily understood from the foregoing description when taken in connection with the accompanying drawings. Assuming the parts to be arranged for feeding automatically and that the end of a drilling operation has been reached, the operator, by tripping the locking device O may release the collar which locks the worm wheel to the shaft E and thereupon by turning the star-wheel the drill spindle may be quickly returned to its initial or starting position, whereupon the locking device may be again thrown into position for engaging the collar $n$ with the worm-wheel N and the operation repeated, or, if desired, the locking device may be allowed to remain out of engagement with the teeth on the hub of the worm-wheel and the star-wheel may be used for feeding by hand.

I thus provide a very simple and inexpensive but durable and efficient drilling machine consisting of few parts assembled in compact form and not liable to get out of order, and combining in a complete whole means for feeding either automatically or by hand, together with means for quickly returning the drill to its initial or starting position at the completion of a drilling operation.

Having thus described my invention, what I claim as new and desire to secure by Letters Patent is:

1. In a drilling machine, the combination with a rotary drill-spindle having a non-rotatable toothed extension slidable longitudinally of the machine, a shaft extending transversely of said extension having teeth engaging said toothed extension for imparting longitudinal movement thereto, means for rotating said shaft by hand, and means for rotating said spindle, together with means actuated by said spindle-rotating means for automatically feeding the drill, and means carried by said transversely arranged shaft including a gear loose on said shaft, a sliding collar adapted to lock said gear to the shaft, and a swinging device adapted to hold said collar in locking engagement with said gear or to release the same for throwing said automatic feeding means out of action to permit feeding by hand.

2. In combination, a rotary vertically movable drill spindle having a non-rotatable toothed extension, a rocking lever, a horizontally disposed crank shaft carrying a gear wheel engaging a gear on said spindle and a cam engaging one arm of said rocking lever, a second horizontally disposed shaft having teeth thereon engaging the teeth on said extension, a worm-wheel loose on said second shaft, means for locking said worm-wheel to said second shaft, a worm-shaft engaging said worm-wheel, a ratchet wheel on said worm-shaft, a pawl carried by said rocking lever in engagement with said ratchet wheel for automatically feeding the drill, together with means for feeding by hand when said worm-wheel is unlocked.

3. The combination in a drilling machine of a vertically disposed longitudinally movable drill spindle having a non-rotatable toothed extension, and means for feeding the drill automatically and by hand, comprising a rocking lever, a transverse shaft having a gear wheel thereon engaging a gear on the drill spindle and a cam engaging one arm of said rocking lever, said lever carrying a pawl on its other arm, a worm-shaft carrying a ratchet wheel engaged by said pawl, a second transverse shaft having a worm-wheel loose thereon engaging the worm on said worm-shaft, a collar slidably fitted on said second shaft adapted to lock said worm-wheel to said second shaft, and a cam device adapted to hold said collar in locking engagement with said worm-wheel, together with a spring for forcing the worm wheel and collar apart when unlocked, and means for rotating said second shaft by hand.

4. In combination with a drill spindle having a non-rotatable toothed extension movable longitudinally therewith, an automatic feeding device comprising a rocking lever carrying a pawl at one end, a driving shaft carrying a cam engaging said rocking lever, a worm-shaft carrying a ratchet wheel engaged by said pawl, a shaft having a worm-wheel loose thereon engaging the worm on said worm-shaft, and also having teeth thereon engaging the toothed portion of said non-rotatable extension, a sliding collar on said worm-wheel shaft having a serrated surface engaging a similarly serrated part on said worm-wheel, a spring for yieldingly holding said worm-wheel and collar apart, and a swinging lever having a cam-faced portion adapted to hold said collar in locking engagement with said worm-wheel and to be thrown into position to release said collar, whereupon said spring will disengage said collar from said worm-wheel.

5. In a drilling machine, a drill spindle having a non-rotatable extension coupled thereto and movable longitudinally therewith, said extension having teeth thereon, a crank shaft carrying a gear wheel in mesh with a gear on said spindle and a cam engaging one arm of a rocking lever, said lever carrying a pawl on its other arm, a shaft carrying a star-wheel and having teeth thereon engaging the teeth on said extension, a worm-shaft carrying a ratchet wheel in engagement with said pawl, a worm-wheel loose on said star-wheel shaft, a sliding collar on said star-wheel shaft rotatable therewith and having means for locking engagement with said worm-wheel, a cam device pivoted on said star-wheel shaft adapted to be thrown into position to force and hold said sliding collar in locking engagement with said worm-wheel, and means for yieldingly forcing said collar and worm-wheel apart when said collar is released by said cam device, whereby the drill spindle may be fed either automatically or by hand, substantially as described.

6. In a drilling machine, the combination with a rotary drill-spindle having a non-rotatable toothed extension slidable longitudinally of the machine, a shaft extending transversely of said extension having a worm thereon engaging said toothed extension for imparting longitudinal movement thereto, means for rotating said shaft by hand, and means for rotating said spindle, together with means actuated by said spindle-rotating means for automatically feeding the drill; said transversely arranged shaft carrying means for throwing said automatic feeding means out of action to permit feeding by hand, comprising a worm-wheel loose on said transversely arranged shaft and having a toothed hub, a collar slidably fitted on and keyed to said shaft so as to rotate therewith, and having a toothed portion engaging the teeth of said hub, a swinging cam device carried by said shaft adapted in one position to hold said collar into engagement with said hub and in another position to release the collar, and a spring adapted to separate the hub and collar when the latter is released.

In testimony that I claim the foregoing as my own, I affix my signature in presence of two witnesses.

HENRY B. KEIPER.

Witnesses:
CHAS. E. LONG,
GEO. HAMMOND.

Copies of this patent may be obtained for five cents each, by addressing the "Commissioner of Patents, Washington, D. C."